Figure 4:
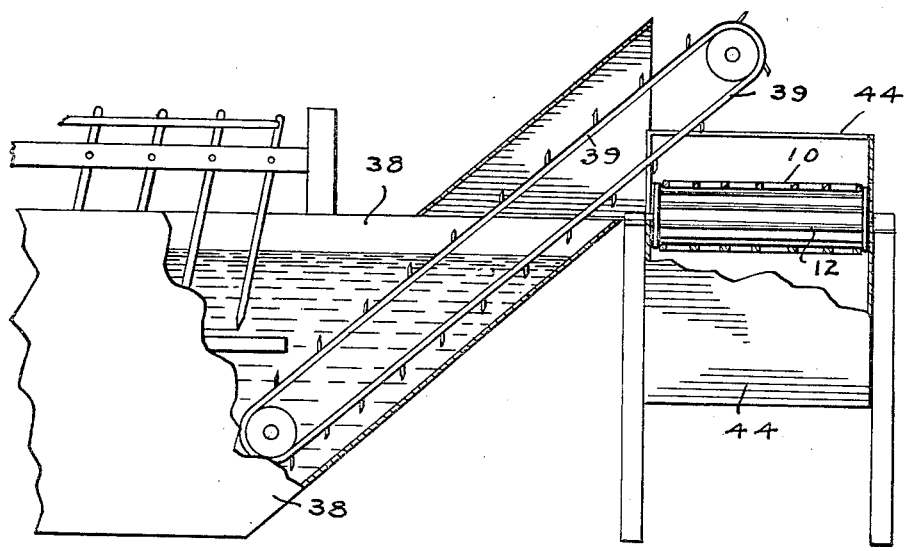

Oct. 17, 1933.                L. C. McNAMARA                1,930,818
     METHOD AND MEANS TO OBTAIN RECLAIMED USED JOURNAL
         BOX WASTE WITH A DEFINITE OIL CONTENT
                 Filed Oct. 18, 1930           2 Sheets-Sheet 1
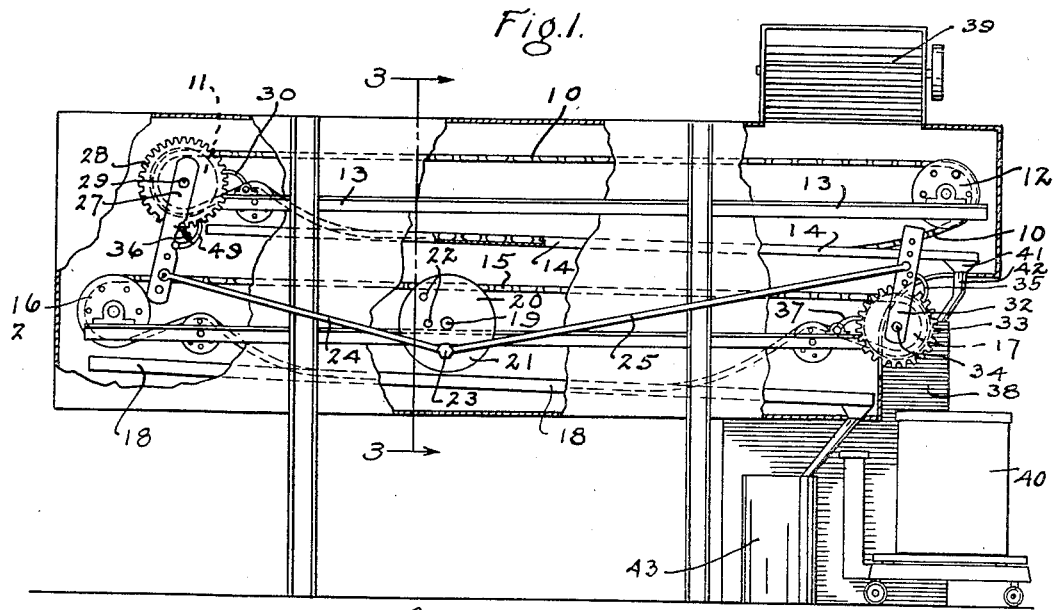
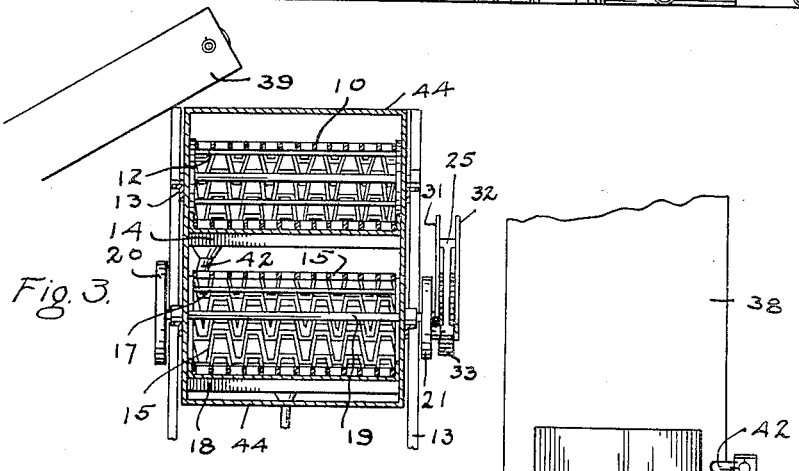
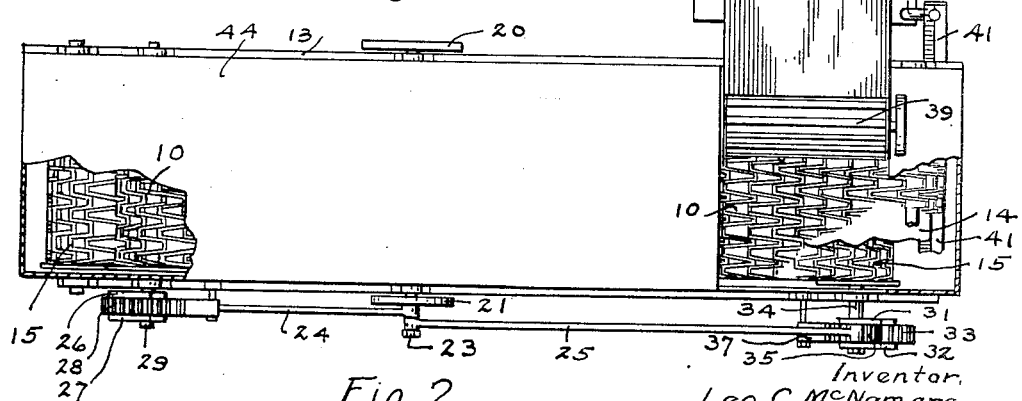
Inventor,
Leo. C. McNamara,
By Minturn & Minturn,
   Attorneys INVENTOR,
Leo C. McNamara, Patented Oct. 17, 1933

1,930,818

UNITED STATES PATENT OFFICE 1,930,818

METHOD AND MEANS TO OBTAIN RECLAIMED USED JOURNAL BOX WASTE WITH A DEFINITE OIL CONTENT

Leo C. McNamara, Indianapolis, Ind.

Application October 18, 1930. Serial No. 489,622

4 Claims. (Cl. 91—13)

This invention relates to the art of reclaiming used journal box waste and has for its primary object the method and provision of means for providing an impregnation of the cleaned waste with a definite amount of lubricating oil without compressing or matting the waste whereby the waste after washing will contain the desired amount of oil and be in a fluffy condition ready for repacking in journal boxes.

Other objects reside in the particular means employed and the various combination of elements therein and such other objects as will become apparent in the following description of the invention as illustrated by the accompanying drawings, in which Fig. 1 is a fragmentary side elevation of a device for carrying out my invention;

Fig. 2, a fragmentary top plan view of the device;

Fig. 3, a vertical transverse section on the line 3—3 in Fig. 1; and Fig. 4, a fragmentary side elevation of the discharge end of a waste washing machine.

Like characters of reference indicate like parts in the several views in the drawings.

I mount an endless belt 10 about horizontally disposed drums 11 and 12 which are rotatably supported by a frame 13. This belt 10 is preferably made of a light reticulated metal construction such as will carry waste but let oil pass therethrough. An oil collecting pan 14 is mounted under the lower return side of the belt 10 to slope toward one end thereof, over which pan the belt may drag.

A second endless belt 15 is mounted under the belt 10 to be carried around the end drums 16 and 17. The drum 16 is spaced longitudinally beyond the discharging end of the upper belt 10 and an oil collecting pan 18 is mounted below the belt 15 to carry the returning belt thereover, the pan 18 being sloped toward one end.

Transversely of the frame 13, I mount a shaft 19 having a driving pulley 20 on one end and a disc 21 on the other end. The disc 21 is provided with a plurality of holes 22 spaced at various radial distances from the disc center, and in one of the holes, depending upon the throw desired, I fix a pin 23 which rockably carries the ends of the connecting rods 24 and 25. The rod 24 extends along the outer side of the frame 13 and has its outer end pivotally carried between the plates 26 and 27 which straddle a gear 28 to be rockably retained on the shaft 29 which carries the belt drum 11, the gear being fixed on the shaft. A pawl 49 rockably carried between the plates 26 and 27 is pulled by the spring 36 to ride by its upper free end over the gear 28, and a dog 30, rockably supported by the frame 13, falls by gravity against the teeth of the gear 28.

The rod 25 extends in the opposite direction along the outer side of the frame 13 to have its outer end pivotally received between the plates 31 and 32 which straddle the gear 33 fixed on the shaft 34 of the drum 17, and which are pivotally mounted on the shaft 34. The plates 31 and 32 carry a rockable pawl 35 therebetween which drops by gravity to have its outer end in the path of the teeth of the gear 33. A dog 37, rockably carried by the frame 13 falls by gravity into the path of the teeth of the gear 33.

The mechanism as described is preferably placed at the discharge end of a waste washing machine 38, the details of which do not enter into this invention, so that waste coming from the washing machine 38 may drop from the discharging conveyor 39 onto the belt 10 near the drum 12. One form of the machine 38 is shown in the U. S. Letters Patent No. 1,783,407 issued December 2, 1930, to Conway and Lawson. Referring to Fig. 4, in the drawings, the machine 38 is formed as a tank to hold heated lubricating oil in which the waste is immersed to become thoroughly saturated therewith. The conveyor 39 has its lower end submerged in the oil in the machine 38 to receive the waste thereon and carry it up out of the oil and discharge the waste from its upper end as above indicated. The shaft 19 is revolved so as to reciprocate the rods 24 and 25, the action of which causes the belt 10 to move by its top side away from the drum 12 toward the drum 11 and thus carry the waste by intermittent travel of the belt to be discharged from over the drum 11 down onto the belt 15 which is being intermittently moved by its top side away from the drum 16 toward the drum 17, from over which as the belt 15 goes therearound, the waste drops into any suitable receptacle such as a drum 40. Since the belt 10 is moving away from the discharge end of the washing machine conveyor 39, the waste falling from the conveyor strings therefrom to touch the belt before leaving the conveyor and thus the belt carries the lower end of the waste therealong to spread the waste out along the belt as it leaves the conveyor whereby the waste is carried on the belt in relatively thin layers of substantially uniform thickness.

As the belt 10 is moved by the ratchet action of the rod 24 working the plates 26 and 27 to and fro to revolve the gear 28 by the pawl 49, the waste thereon is given a jerky motion. The waste comes from out of a bath of lubricating oil in the washing machine 38, and as it is jerked along intermittently on the belt, the oil carried by the waste may drain down through the belt 10 to be caught in the pan 14 and drained back to the machine 38 by the trough 41 and pipe 42. The oil continues to be drained from the waste as it returns on the lower belt 15.

The waste having been thoroughly saturated and deposited upon the belt 10 with an excess of lubricating oil from the machine 38 and the amount of oil desired to be left in the waste being known, the rate of travel of the belts 10 and 15 is adjusted from the shaft 19 by varying the position of the pin 23 on the disc 21 and also by shifting the outer ends of the rods 24 and 25 up and down between the respective plates 26, 27 and 31, 32 which variations will accordingly effect the circumferential travel of the gears 28 and 33 by their respective pawls, whereby, by the time the waste is dumped from the belt 15 into the drum 40, the waste has been drained to have just the correct amount of oil content remaining, which content is checked from time to time.

The lower oil pan 18 drains into any suitable receptacle, such as the drum 43, from which the oil may be returned to the machine 38. The belts 10 and 15 are preferably enclosed by a metal housing 44 to retain a uniform temperature within. The oil in the machine 38 is maintained at a relatively high temperature, and it is desirable to retain the heat of the oil while the waste is carried by the belts 10 and 15 so as to permit proper draining of the oil therefrom.

From the foregoing description, it is thus to be seen that waste initially saturated and dripping with oil is carried for an appreciable time interval on draining belts without being passed through wringers or centrifugal machines, and that by controlling the time interval, the waste may be brought to have any desired oil content by the time it is dumped from the belts. By dumping the waste from the draining belt at the end of the predetermined time interval the waste is then slightly compressed and also surrounded by an imperforate wall so that further separation of the oil from the waste is arrested and the waste is held ready for use in a loosened fluffy condition free from any matted or felted condition as was encountered heretofore in using centrifuges or the customary wringer rolls.

While I have herein shown and described the device as having two belts 10 and 15, it is entirely possible to employ but one belt 10, providing there is sufficient room to extend its length in order to handle the waste as fast as it may be dumped on the belt from the machine 38, and it is obvious that other variations in the structure may be made without departing from the spirit of the invention, and I, therefore, do not desire to be limited to the precise form as shown and described, nor any more than may be required by the following claims.

I claim:

1. That method in the reclaiming of used journal box waste in a continuous operating system which comprises lifting the waste from a bath of hot oil, suspending the waste in small masses in relatively thin layers to permit the oil to drain therefrom by gravity, moving the suspended waste along away from the bath while draining for a definite time interval which is correlated with the rate of draining of the oil to obtain a definite residual oil content in the waste, and dumping the waste into a mass to prevent further separation of the oil therefrom.

2. In the art of journal box waste reclamation, the step of suspending heated oil saturated waste spread out in a relatively thin layer for a definite time interval to allow the oil to drain therefrom by gravity to leave a definite amount of oil in the waste as predetermined for final lubricating use, and the step of placing the waste in a mass following said time interval to prevent further removal of oil, whereby the waste is maintained in a fluffy loosened condition ready for use in repacking journal boxes.

3. In the art of reclaiming used journal box waste, the step of lifting washed waste from a bath of hot oil, the step of continuously suspending and spreading out the waste in an oil saturated condition as rapidly as taken from the bath in substantially a uniform, relatively thin layer to allow the oil to drain therefrom by gravity; the step of maintaining the suspension of the waste for a definite time interval which is correlated with the thickness of the waste layer and the temperature of the waste and oil; and the step of arresting further draining of the oil from the waste at the end of said interval, said waste being maintained in a heated condition while suspended to preserve a known oil content temperature.

4. In means to provide journal box waste with a definite degree of lubricating oil saturation, the combination of a tank in which the waste is thoroughly saturated with lubricating oil, a perforated belt adapted to receive the saturated waste from the tank, and a closed wall receptacle at the discharge end of the belt, said belt being moved toward the receptacle at a speed dependent upon the residual oil content desired in said waste so as to permit excess oil only to drain from the waste before reaching said receptacle, and said waste being dumped from the belt into said receptacle to prevent further draining of the oil therefrom.

LEO C. McNAMARA.